3,133,063
METHOD FOR PRODUCING MELAMINE

André Claude Vialaron, La Barthe de Neste, France, assignor to Societe des Produits Azotes, a corporation
No Drawing. Filed Feb. 9, 1962, Ser. No. 172,087
9 Claims. (Cl. 260—249.7)

The present invention is concerned with the transformation of dicyandiamide into melamine. More particularly, it relates to an improved procedure wherein preheated dicyandiamide is subjected to a controlled atmosphere of ammonia gas at autogenously developed elevated temperatures and super-atmospheric pressures.

It is well known that when melted inside a container, dicyandiamide is rapidly polymerized. Ammonia gas is released and melamine is formed. Unfortunately, however, so are other products. These latter form to such an extent that the method is not practical for industrial production. Both the yield and purity of the resultant melamine are inadequate.

Various proposals have been advanced for improving the yield. Several suggested methods include carrying out the reaction in the presence of added ammonia. Of these latter methods, two have been used industrially to some extent. However, each falls into a quite different operational category.

In one, a type of procedure with which the present invention is no way concerned, dicyandiamide is converted to melamine in a mixture containing liquid ammonia. In this method, the reaction temperature does not rise above about 200° C. because of the large heat-storage capacity provided by the mass of liquid ammonia and in an auxiliary manner by other liquid or solid products.

In the second type of reaction, dicyandiamide is heated, usually sufficiently to cause melting, locally or entirely, by furnishing heat from external sources in amount sufficient to raise the temperature of the reaction mass to some 210° C. This is usually done under an increased pressure of added gaseous ammonia. In some cases the added ammonia is diluted with nitrogen or other gases.

One of the better of such proposals is shown for example in British Patent No. 524,349. As disclosed therein, dicyandiamide is preheated in the presence of ammonia to about 160°–200° C. Additional liquid and/or gaseous ammonia at 67° C. then is added under a controlled pressure of some 350 to 600 pounds per square inch gauge (p.s.i.g.). Reaction is exothermic and additional ammonia gas is liberated as a by-product. Relief valves are provided and so set as to prevent any increase in total applied pressure. Temperature, however, is not otherwise controlled.

Many ancillary proposals have been made, including numerous methods of preheating; of ammonia recovery and the like. Unfortunately, even with the best of such proposals, the melamine yield and purity still remain less than desired. Melamine yields of crude product are low, usually some 92–96% containing as much as 5–8% of water-insoluble impurities.

In many chemical procedures such results would be considered highly acceptable. However, they are well below the high yields of melamine containing not more than 0.5% impurities desirable to constitute an economically satisfactory procedure. Nevertheless, this type of process otherwise has several attractive features. If the yield and purity could be adequately increased, this general procedure would be highly useful. It is, therefore, a principal object of this invention to provide such improvements.

Despite the long previous history of failure, in the present invention both yield and purity are increased to a surprisingly successful degree. Substantially complete conversion of dicyandiamide to melamine containing the desired low 0.5%, or less, of water-insoluble impurities is readily obtainable.

My invention involves a novel combination of operational steps, each done in correct sequence under proper conditions. In general terms these comprise: (1) without added ammonia, uniformly preheating and drying crystalline dicyandiamide under ambient pressure to the correct initial temperature; (2) only then, subjecting the preheated dry crystals to the correct "initial" overpressure of added ammonia gas; (3) so correlating said initial conditions that temperature and total pressure subsequently increase autogenously to correct maxima; (4) retaining the resultant "total" overpressure; (5) thereunder, adequately cooling the reaction mass; and (6) only then, relieving the ammonia overpressure and collecting the product melamine.

Expressed in these broad terms, the seeming simplicity of the overall process is deceptive. Each operation must be carried out within a definite range of limitations. Moreover, of the permissible conditions for each step, those selected must be coordinated with those for the others. This is amplified in the following discussion. Before so doing, however, some general considerations should be noted. For brevity, dicyandiamide is referred to below as "dicy."

GENERAL CONSIDERATIONS

According to the present invention, I have found that when dicy, previously preheated to a suitable temperature, is subjected to an adequately high overpressure of ammonia gas, quite surprisingly, a non-stable, liquid phase is obtained without further heating. For simplicity in identification, this liquid is hereinafter called the "melt."

This melt is not merely fused dicy. It does not form until an adequate ammonia gas overpressure is applied, but then forms very rapidly. It appears to comprise a dicy-ammonia mixture containing a relatively small amount of combined ammonia, ordinarily not exceeding about two weight percent. This melt per se does not comprise the melamine reaction product. It is, however, a mass which is self-polymerizable to melamine. Once the melt is formed, reaction appears to start almost immediately but slowly. There is a slow increase in temperature to some level at which reaction suddenly becomes very rapid and highly exothermic. The period of time during which ammonia is added, the melt forms and the temperature rises slowly is hereinafter referred to as the "induction" period. The period during which reaction is rapid and highly exothermic is referred to as the "reaction" period.

Since reaction is carried out under a superatmospheric ammonia gas overpressure, a pressurizable vessel obviously must be employed. However, this is not an unduly restrictive limitation. Many suitable autoclaves are commercially available. Preheating is normally done at atmospheric pressure before applying any increased ammonia pressure. Accordingly, preheating need not be done in the autoclave. It may be done in separate equipment, heated dicy being transferred to the autoclave before applying the initial application of ammonia gas overpressure.

Dicy may be preheated in loose bulk, as on conveyors, or the like. Alternatively, dicy may be preheated in suitable containers which, with their contents, then can be put into the autoclave. If so desired, dicy preheated in bulk also may be used to fill separately preheated cans. For several reasons, the latter procedure is believed to be preferable.

It is highly desirable that dicy be as dry as possible before being subjected to the overpressure of ammonia gas. Otherwise, all the residual water content is vaporized during subsequent operations. Its formation may effect the temperature and vary the partial pressures in localized zones in the autoclave. Moreover, it will all ultimately report as ammeline, ammelide and the like, thus reducing the melamine yield. Accordingly, during the preheating, dicy should be adequately vented to provide for any drying which may occur.

Iron is a highly objectionable contaminant in the ultimate product. In addition, ferrous metals appear to have an adverse effect on the reaction. Contact of such metals with the reaction mass must be avoided. Accordingly, containers or cans containing ferrous metals should be avoided. However, such non-ferrous metal containers may be used quite satisfactorily inside an iron or steel autoclave.

Practically, also, the material of choice in constructing preheating cans should have good heat transfer properties and should not interact with the reactants or reaction products. Aluminum containers have been found quite satisfactory. Being readily and economically constructed they are accordingly preferred. However, the use of aluminum vessels does not form a part of the invention claimed herein and practice of the present invention is not necessarily limited thereto.

Other than the sensible heat in the dicy and the ammonia, my preferred modus operandi requires no further application of additional heat for reaction to begin and continue. Provided no catalytic action of the wall of the reaction chamber adversely effects the amine function of the melamine, both the melamine yield and purity are definitely increased over those previously obtainable.

THE PREHEATING OPERATION

In the first actual operational step, preheating, certain additional definite limitations must be observed. All of the dicy must be preheated. Moreover, so far as possible, it should be heated to the same general temperature level throughout its mass.

Moreover, the temperature to which the dicy is preheated will effect other control factors. For instance, for any one autoclave and charge of dicy, the overpressure developed by a given weight of added ammonia is lower at lower temperatures. There appear to be certain minimum temperature and initial ammonia pressure limits below which the charge will not enter into the reaction period at least with any reasonable time. At low preheat temperatures, much larger amounts of added ammonia gas are required than necessary at higher temperatures.

If these factors are properly correlated, the melamine can be obtained after preheating to as low as about 70° C., although the induction period becomes very long. At temperatures below about 70° C., no reaction can be feasibly obtained, regardless of the ammonia pressure.

After preheating to about 75° C., reaction can be obtained after an induction period of some 60–70 minutes in the presence of sufficient added ammonia. Since higher preheat temperatures also result in shorter induction periods and a more economical utilization of the autoclave, preheating to at least about 85° C. is a much better procedure. I have found the preferred range to be still higher, i.e., above about 100° C.

The upper temperature limit for preheating is just below the melting point of the dicy. Even partial fusion of dicy should be avoided during preheating. Otherwise, in subsequent steps uniform ammonia gas penetration of the preheated mass is not feasible. In the preferred practice, therefore, dry, granular dicy usually will be preheated to a temperature of from about 100° C. to one which does not reach the melting point.

AMMONIA INTRODUCTION

In any case, preheated dicy then is transferred into the autoclave; the latter is closed, and sufficient ammonia is introduced to produce the desired initial ammonia gas overpressure. Preferably, the ammonia used should be as free as practicable from any diluent gases. In any case, ammonia gas must be brought into contact with the dicy and allowed to penetrate the preheated dry dicy mass. This should be accomplished as quickly as possible. The time required varies with the equipment, but is usually less than about five minutes.

Ammonia is preferably added as vapor but it may be liquid or both. Any decrease in temperature extends the induction period. Therefore, the ammonia should contain sufficient sensible heat to prevent an excessive drop in temperature of the can or its contents. So far as possible also, contact between liquid ammonia and the container or its content should be avoided. Otherwise, localized cooling occurs and melamine production is adversely effected.

The correct amount of ammonia gas to be introduced into the autoclave will vary principally with two factors. As noted above, one is the preheat temperature. The other is the free space within the reaction vessel. In general, enough ammonia must be introduced to fill the free space and produce the necessary initial overpressure of ammonia.

A single numerical lower limit for the weight of added ammonia required is very difficult to define. Obviously, it will vary with temperature, as noted above, at lower temperatures more ammonia by weight being required to produce the desired overpressure and obtain a successful induction period and melt formation. It will vary also, with every different autoclave and every change in the charge size. In general, however, the initial overpressure required to be produced by added ammonia will vary the least of these factors. Accordingly, this "initial overpressure" is used herein to define the amount of ammonia added.

Illustratively, for example, after preheating to some 70° to 75° C., enough ammonia must be added to produce a minimum "initial" ammonia pressure of some 410–435 p.s.i.g. This minimum will average about 420 p.s.i.g. (30 kg./$\overline{cm}$.$^2$). In general, a lower initial pressure will not result in the reaction period being reached regardless of the preheat temperature. By comparison, at about 150° C., a much lower weight of ammonia will produce the same pressure and the reaction period is reached much more quickly. In general, it will be found that whatever the other variables, an initial partial pressure of at least about 30 kg./$\overline{cm}$.$^2$ is desirable. When both temperature and pressure are at about these minima or below these levels, reaction during the induction period becomes so slow that the temperature will not increase but will decrease due to normal heat losses. Since the minimum practical initial pressure can be achieved with less ammonia after preheating to higher temperatures and the induction period is usually shorter, such temperatures are preferable.

The maximum amount of ammonia which ordinarily will be added is discussed below in noting the pressure autogenously developed during the reaction period. As can be better demonstrated in that connection, actually there is no critical upper limit on the initial partial pressure. However, an unduly excessive amount of ammonia should not be added here since the resultant unnecessarily high total pressure does little, if any, practical good; is economically wasteful; may unduly shorten the induction period; and unecessarily increases the structural limitations on the autoclave.

During ammonia gas introduction, cooling may occur due to ammonia expansion and/or vaporization. Heat is also lost from the equipment to the atmosphere throughout the induction period. So far as possible, excessive loss of sensible heat during these operations should be minimized. This may be done in any desired way as by additional heating of the ammonia feed and/or the autoclave. Once the ammonia is completely introduced, i.e., the initial partial pressure is established, the induction period follows. As noted above, the temperature ordinarily will change, rising rather slowly during the actual induction period. This continues to a temperature level of about 140°–150° C., at which the reaction period starts.

THE REACTION PERIOD

Immediately thereafter, the melt enters the rapid, highly exothermic reaction period during which the remainder polymerizes to melamine. Without meaning to limit this invention to any particular theory, it would appear that during the reaction period dicy is rapidly and substantially completely converted to substantially pure melamine. Attaining the desired melamine yield and purity thus appears to be a problem of recovering so-formed melamine without its undergoing further substantial change. This is accomplished successfully in my overall operational procedure.

In the absence of any large heat-storing capacity, the resultant reaction is highly exothermic and occurs rapidly. Both the temperature of the reaction mass and the total pressure rise very rapidly. Unless controlled, the resultant temperature will readily exceed the melting point of the melamine. If this occurs, the pressure must be sufficiently high. Otherwise, product melamine is rapidly converted to other higher polymer products such as melam and the like. This must be avoided.

During conversion to melamine, additional ammonia is liberated. This and the initially-added ammonia expand with the temperature and increase the resultant autogenous "total" pressure. In the above-noted British patent, this latter factor is controlled by discharging both originally added ammonia and generated ammonia through the relief valves set to maintain a relatively low pressure of some 350–600 p.s.i.g., and thereby obtain some cooling. Thereby, patentees did obtain improved yields over those previously reported for this type of reaction.

According to the present invention, however, I depart completely from this teaching. I retain all of the so-liberated ammonia in the autoclave and allow the resultant total pressure as well as the temperature of the reaction mass to increase to whatever the autogenously-developed maxima. Surprisingly, this does not produce inferior results, as would be anticipated from the British patent. Instead, I obtain a marked improvement thereover. Both yield and purity of the product melamine may be readily increased to the desired 99.5% and may be increased to 99.9%, in many cases.

To distinguish over the "initial partial pressure" of added ammonia introduced into the autoclave, the pressure which develops during reaction is referred to herein as the "autogenous" or the "total" pressure. Obviously the two are related. If the initial partial pressure is varied, the autogenous total pressure will vary accordingly. Therefore, a minimum "initial" pressure must be used which not only will meet the above-noted requirements but will be also sufficiently high to produce the necessary minimum total pressure.

A minimum total pressure is required which will prevent product melamine losses by formation of melam and the like, as noted above. If the autogenous or total pressure is greatly in excess of this minimum, no essential benefit is obtained. Moreover, use of excessively high pressures will require a stronger and more expensive pressure vessel and increase the maintenance problems.

In theory, sufficient heat is produced to raise the temperature to some 450° C. under perfectly adiabatic conditions. Since some heat is always stored or lost, this does not occur. In general, autogenous temperatures ranging from about 340° to nearly 400° C. may be anticipated. Maximum temperatures below about 350° or above about 385° C. should be avoided wherever possible and these temperatures constitute about the limits of the preferred range. Therefore, in good practice the minimum total pressure at such temperatures should be at least equivalent to about the following:

| Temperature | P.s.i.g. | Kg./cm.² |
|---|---|---|
| 350° C | 840 | 60 |
| 370° C | 980 | 70 |
| 380° C | 1,020 | 80 |
| 390° C | 1,160 | 90 |

Heat loss or removal as a factor effecting the maximum temperature and/or total pressure should be further noted. Heat evolved by the reaction is taken up not only by the reaction mass but also the equipment being used. Further, sensible heat is always lost to the surrounding atmosphere. Such factors differ in differing equipment and with differing charges. However, if necessary or desirable, these and the like factors may be utilized to obtain temperature control.

For example, if in a particular system the maximum autogeneous temperature reached by the reaction mass tends to be too high under the maximum practical autogenous total pressure, the heat storing capacity of the equipment may be increased in various ways, as by addition of metal to the can. If so desired, melamine may be recycled, being used to replace a part of the dicy to provide additional heat storage capacity. Heat also may be removed as by decreasing the insulation of the autoclave or by circulating cooling fluid through the autoclave. In some cases, the latter will be found preferable over the practice of increasing the initial pressure to obtain a higher total pressure. If the maximum temperature remains too low, converse actions may be desirable.

THE COOLING PERIOD

In accordance with my invention, I have found that one of the critical periods in obtaining the product melamine quality and quantity desired, is that during which the reaction mass is being cooled. Of major importance during this operation is the total pressure and the temperature.

All gas initially introduced into the autoclave and/or generated during the reaction period is retained therein. These produce the autogenous total pressure developed during the reaction period. Ordinarily maximum temperature and maximum pressure are obtained almost simultaneously in a substantially adiabatic cycle. The reaction mass temperature remains at the maximum for a short time, then starts to drop, indicating start of the cooling period.

Since the cooling period is usually the longest single period in the overall cycle, it is desirable that it be minimized. This is necessary for optimum economic utilization of the equipment and to reduce the time during which melamine is at a temperature sufficiently high for potential further conversion to other products. In other reactions, it is often considered good practice under such circumstances to discharge the pressurizing gas and open the autoclave as soon as possible, thereby accelerating cooling and shortening the overall cycle. Contrary to such practice, in the present invention premature pressure relief must be avoided.

I have found it essential in obtaining melamine of maximum yield and purity that at least the autogenous total pressure be retained on the cooling mass until the product melamine has cooled to the proper temperature level. During cooling, the autogenous total pressure normally will decrease at a corresponding rate. However, gas should not be discharged from the vessel prematurely. As noted above, until the melamine reaches the desired lower temperature the total pressure must be maintained sufficiently high. Otherwise melamine is lost by deammoniation to insoluble by-products.

As previously also noted, for a particular equipment set-up, the autogeneous total pressure is effected by the charge size and the initial gas pressure. Combinations are theoretically possible in which the autogenous total pressure may not be sufficiently high at the maximum temperature or at some time during cooling. This problem is usually readily curable by changing either the charge or increasing the initial overpressure. Where neither is desirable or practical, additional ammonia may be pumped into the autoclave and the pressure then held sufficiently high by maintaining the pump pressure on the system.

Some latitude is allowable in determining the temperature which should be reached during cooling. To insure the maximum yield and purity, the overpressure should not be relieved until the temperature of the product mass is reduced to about 250° C. or less. Cooling progresses uniformly from the cool wall inwardly so the last zone to cool is at the center of the mass. The temperature should be measured in this zone.

Further, to insure obtaining this maximum yield and purity, I have found the overpressure should not be relieved until the temperature of the reaction product mass is below about 250° C. The temperature drop is not uniform throughout the mass and this temperature should be determined for the warmest zone or zones.

Various known engineering expedients may be used to shorten the cooling period. These include, for example, circulation of cooling fluid through the autoclave jacket and/or cooling coils in the vessel; adding liquid to the annular space between can and vessel to transfer heat from the can to the cooled surface, and the like. Liquid ammonia is the preferred coolant liquid. There is a marked decrease in charge volume when the "melt" forms during the induction period. If a cooling liquid such as ammonia is used, it should be added in amount sufficient to bring the liquid coolant level above the level of the top of the reaction mass. Other coolant liquids may be used if desired or necessary. However, this unnecessarily complicates the problem of recovery and reuse of the ammonia.

Some possible exceptions to the 250° C. cooling limit should be noted. Some loss may occur as by sublimation at higher temperatures. These mechanical losses however are small and are not the most serious problem. The exact melting point of product melamine under the reaction conditions is not wholly certain. At the start of the reaction period the "melt" is liquid. If the maximum temperature is below the fusion point, presumably the melamine forms as solid product. In many, if not most, cases, however, at the maximum temperature the melamine will be partially or wholly in the liquid state. In any case there will be a liquid phase and a solid melamine layer forms in the cool wall and progresses inwardly.

If while any melamine is in the liquid state, the pressure decreases below the limit indicated above to be necessary for the particular temperature, it is almost immediately deammoniated. The result loss in yield produces about an equal increase in the water-insoluble contaminant content. Therefore, cooling must be continued under the necessary pressure until at least the desired yield of melamine is solidified, i.e., in the illustrative case about 99.5% or more. The liquid residue is at the central core of a mass of solid melamine through which heat transfer is very slow. Cooling while the last 0.1 or 0.2% is being solidified is very slow and may require longer than the previously elapsed cooling time.

Melamine produced for some purposes may have a higher content of permissible water-insoluble impurities than required for other uses. In some cases, therefore, it may not be desirable to try to obtain the maximum potential quantity and quality. Optimum production may be preferred, any melamine lost by pressure relief after a shorter cooling period being offset by other economic considerations. Opening the vessel sooner may be economically advantageous in such cases. In any case, the vessel should not be opened until the necessary yield of melamine is in the solid state. Otherwise, any loss by opening the vessel sooner is not merely mechanical loss but also directly results in added contaminants. The loss is in both yield and purity.

Therefore, the 250° limit, while preferable, is not essential and the duration of the cooling period may be varied in accordance with economic considerations. The actual cooling period limits in any one operation will be determined by whether the maximum or the economically optimum production and/or quality is desired.

Once the cooling period is completed, the pressure is relieved and the container and/or product removed from the autoclave. Product melamine may be collected in any desired manner, the method of collecting not forming a critical feature of the present invention.

In opening the vessel, one additional factor should be considered when using an iron or steel autoclave. Particularly is this true of top-opening equipment. As noted above, even minute traces of iron in the product are objectionable. Use of an ammonia atmosphere in the vessel causes iron-bearing corrosion products on the inner walls, including the cover. Particles thereof may be dislodged during the operating cycle. For this reason, while the inner container or can should be open to permit free ammonia gas circulation, it usually should be provided with some loose hood or cover to prevent such loosened corrosion products from falling into the melamine product.

The invention will be more fully illustrated in conjunction with the following examples wherein all parts and percentages are by weight and temperatures in degrees centigrade unless otherwise noted. Also unless otherwise noted, reaction is carried out in an open-top aluminum can about one foot in diameter and about five feet high, having an open central tube about two inches in diameter. A steel autoclave equipped for the circulation of heating or cooling fluid is used.

*Example 1*

To illustrate the capability of the instant invention to produce high yields and purity, about 55 kg. of dry, crystalline dicy is placed in a 100 liter can and can and content are hated at atmospheric pressure to about 150° C. The heated can and content are placed in an autoclave and the latter is pressure sealed. Over about a five minute period, about 4 kg. of ammonia gas is introduced into the annular space between the can and the inner wall of the autoclave, producing an initial ammonia pressure of about 35 kg./$\overline{cm.}^2$. For about 20 minutes, during which is formed the dicy-ammonia combination adapted to become the liquid phase melt at the prevailing temperature and pressure conditions, the temperature rises very slowly. Thereafter, both temperature and pressure start to rise very rapidly. The total pressure increases to a maximum of about 80 kg./$\overline{cm.}^2$ during the concurrent temperature increase to about 350° C. Thereafter, over a period of about three hours, the autoclave is cooled by circulation of steam therethrough and the temperature drops to about 250° C. The autoclave is then pressure relieved and the can and content are removed. From the can, melamine is removed as a crumbly, white, crystalline mass. The latter is readily converted to the desired product simply by light crushing. The melamine product is weighed and sampled for assay. Based on the dicy fed, the melamine yield is about 99.9% of theory. It contains less than 0.1% of water-insoluble impurities.

*Example 2*

In a larger equipment set up, using an aluminum can having one open central tube and a distance of about six inches between metal wall surfaces, about 887 pounds of dicy containing 0.1% moisture is heated to about 115° C., and added to a can inside the autoclave. The autoclave is sealed and about 110 pounds of ammonia is vaporized into the autoclave over about two minutes, producing an initial pressure of about 590 p.s.i.g. Over about 19 minutes the pressure decreases to about 535 p.s.i.g. after which the pressure and temperature increase rapidly to about 1110–1120 p.s.i.g. and about 363° C. About 400 pounds of ammonia is pumped into the free space within the clave and water at 70°–95° C. is circulated through the cooling jacket, maintaining the ammonia pressure at from about 1070 to about 980 p.s.i.g. for three and a quarter hours during which the charge becomes substantially completely solidified. The pressure, relieved to atmospheric over about 25 minutes. The can is removed and the melamine collected and assayed. Yield is about 99.5% of theory containing only 0.01% water-insolubles.

*Example 3*

Using a larger autoclave and can, the can having three open tubes and a distance between metal walls of about six inches, the procedure of Example 2 is substantially repeated using a charge of 3000 pounds of heated dicy and an initial ammonia pressure of about 750 p.s.i.g. Maximum temperature reaches about 385°–390° C. Yield is about 99.8% of theory of melamine containing less than 0.2% of water-insolubles.

In order to illustrate the advantages of the present invention as compared with the prior practice of controlling the overpressure by gas discharge at a fixed but lower maximum level, the following examples are given.

*Example 4*

The procedure of Example 1 is repeated except that the initial pressure is 33 kg./$\overline{cm.}^2$ and the maximum pressure is maintained at 42 kg./$\overline{cm.}^2$ by releasing ammonia gas. The pressure is relieved and the product collected after a three hour cooling period. The product is very hard and assays 3.3% water-insolubles.

*Example 5*

The procedure of Example 2 is repeated except that the maximum pressure is maintained at about 485 p.s.i.g. until the end of the cooling period, pressure being maintained for about two hours by discharging ammonia gas and thereafter by pumping in additional ammonia, 21 pounds being required by the end of the cooling period. The melamine yield is 92.6% of theory and contains 6.9% of water-insolubles.

*Example 6*

Example 5 is repeated, maintaining the maximum pressure at about 600 p.s.i.g. until the end of the cooling period during the latter part of which an additional 17 pounds is required. The melamine yield is 95.2% of theory and contains 4.1% of water-insolubles.

As such, this application constitutes a continuation-in-part of my copending application Serial No. 636,888, filed January 29, 1957, now abandoned.

I claim:

1. In converting dicyandiamide to melamine by exothermic polymerization at elevated temperatures and pressures in the presence of added ammonia; the improved method which comprises the steps of:
    in the absence of added ammonia, substantially uniformly preheating the whole of a known weight of particulate dicyandiamide
        to a temperature above about 70° C., but below its melting point;
    then, and only then, in a closed space, subjecting said preheated dicyandiamide
        to an initial overpressure of an atmosphere of ammonia gas consisting essentially of an added weight of ammonia
            in amount sufficient to produce an initial overpressure of at least 280 p.s.i.g.;
    whereby said exothermic reaction is initiated, melamine is formed, the temperature of the reaction mass rises, additional ammonia gas is liberated, and the total overpressure increases;
    selecting the weight of added ammonia in a sufficiently high ratio to the weight of said dicyandiamide that said temperature rise is to a preselected temperature
        above about 340° C.,
        and said total overpressure increase is to a minimum equivalent to that ranging
            from about 840 p.s.i.g. at about 350° C., to about 1020 p.s.i.g. at about 380° C.;
    thereafter, removing sensible heat from the reaction mass at the rate
        necessary to prevent the reaction mass temperature exceeding a maximum temperature in the range between said preselected temperature and about 400° C.;
    whereby the equivalent overpressure is established; maintaining substantially the resultant temperature and pressure conditions until the reaction mass temperature starts to decrease;
    then, while retaining all the ammonia in said closed space and maintaining said overpressure as high as that autogenous at the temperature;
    cooling the reaction mass to a temperature sufficiently low that substantially all the product melamine is in the solid phase; and
    only then relieving the overpressure and collecting resultant product melamine.

2. A process according to claim 1 in which said initial overpressure is at least 420 p.s.i.g.

3. A process according to claim 1 in which said preheated particulate dicyandiamide is preheated to at least 100° C.

4. A process according to claim 1 in which said preselected temperature is between 350° and 385° C.

5. A process according to claim 1 in which said maximum temperature is between 365° and 400° C.

6. A process according to claim 1 in which the reaction mass is cooled to a temperature of from about 250° to about 275° C., before relieving said overpressure.

7. A process according to claim 1 in which the initial overpressure is at least 420 p.s.i.g. and is so selected that the temperature of the reaction mass rises to from about 350° to about 365° C. under the autogenous pressure and the temperature and pressure then remain substantially constant without external cooling until substantially all the dicyandiamide is converted to melamine.

8. A process according to claim 7 in which all the ammonia is retained in the closed space until the reaction mass temperature decreases to between about 250° and about 270° C.

9. A process of converting to melamine a known weight of dry dicyandiamide preheated to above 70° C. but below its melting point which comprises:
    in a closed space, contacting said preheated dicyandiamide with a sufficient initial weight of ammonia gas to produce a partial pressure of ammonia under which exothermic polymerization is induced with evolution of additional ammonia gas;
    so adjusting the weight of said dicyandiamide and said initial weight of ammonia in accordance with the volume of said closed space that said exotherm produces (a) an increase in temperature to from 340° to 400° C. under (b) a resultant autogenous overpressure at least that equivalent to that of from 840 p.s.i.g. at 350° C. to 1160 p.s.i.g. at 390° C.;

retaining in said closed space, all said initially added and all said liberated ammonia and maintaining said autogenous overpressure until cooling of the reaction mass is initiated;

then continuing to retain all said ammonia and to maintain the resultant autogenous overpressure until the reaction mass temperature is decreased to below about 250° C.;

and then, and only then, discharging ammonia, relieving the overpressure and collecting resultant product melamine.

References Cited in the file of this patent

FOREIGN PATENTS 524,349  Great Britain _____ Aug. 5, 1940